United States Patent [15] 3,660,663

Guildford et al. [45] May 2, 1972

[54] RADIATION DETECTION SYSTEM USING PSEUDO-RANDOM REVERSIBLE SCANNING TECHNIQUES

[72] Inventors: Leslie Henry Guildford, Haywards Heath; Richard Frank Mitchell, Cambridge, both of England

[73] Assignee: U.S. Philips Corporation

[22] Filed: May 2, 1969

[21] Appl. No.: 821,407

[30] Foreign Application Priority Data

May 8, 1968 Great Britain........................21,788/68

[52] U.S. Cl........................250/83.3 H, 250/220 R, 250/235
[51] Int. Cl........................................................G01t 1/16
[58] Field of Search................250/83.3 IR, 83.3 R, 219 WD, 250/222, 83.3, 220, 235; 178/DIG. 3

[56] References Cited

UNITED STATES PATENTS 2,717,329 9/1955 Jones et al. .......................178/DIG. 3
3,342,937 9/1967 Deutsch...........................178/DIG. 3
2,848,626 8/1958 Brackmann..........................250/83.3
3,259,022 7/1966 Vietorisz........................250/219 UX
3,475,608 10/1969 Pardes................................250/83.3
3,509,345 4/1970 Astheimer...........................250/83.3

*Primary Examiner*—James W. Lawrence
*Assistant Examiner*—Davis L. Willis
*Attorney*—Frank R. Trifari

[57] ABSTRACT

An imaging system including means for scanning a linear array of detectors across the scene to viewed field by field, consecutive fields being scanned in opposite directions. Every picture element of the scene is reproduced once during a frame, which is made up of at least two fields and preferably an integral multiple of two. The system also includes means for sampling the detectors in a pseudo random pattern. The sampled signals are multiplexed and displayed on a CRT having an electron beam that is deflected in synchronism with the sampling pattern. Each field is divided into a non-integral number of vertical areas.

22 Claims, 5 Drawing Figures

Figure 1:
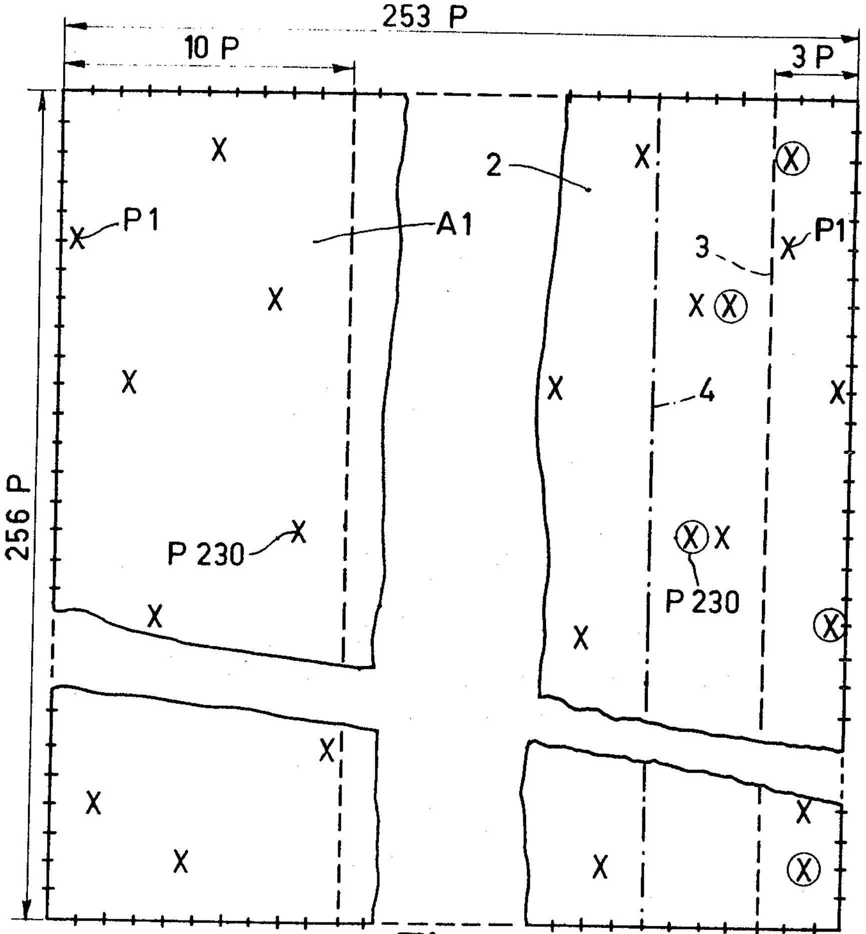

INVENTORS
LESLIE H. GUILDFORD
RICHARD F. MITCHELL
BY
Frank R. Trifari
AGENT

INVENTORS
LESLIE H. GUILDFORD
RICHARD F. MITCHELL
BY
AGENT

| | | | | | | | | | |
|---|---|---|---|---|---|---|---|---|---|
| G 19 | 0 | 1 | 2 | 3 | 4 | 5 | 6 | 7 | 8 |
| G 17 | 0 | 0,5 | 0,25 | 0,75 | 0,125 | 0,625 | 0,375 | 0,875 | 0,0625 |
| P Nº | 0 | 128 | 64 | 192 | 32 | 160 | 96 | 224 | 16 |

INVENTORS
LESLIE H. GUILDFORD
RICHARD F. MITCHELL
BY
Frank R. Trifari
AGENT

RADIATION DETECTION SYSTEM USING PSEUDO-RANDOM REVERSIBLE SCANNING TECHNIQUES

The present invention relates to an imaging system provided with a pick-up apparatus employing an array of detectors which are sensitive to radiation from a scene to be viewed, the scene swept across and projected on said array of detectors being converted field by field, the picture elements of the scene viewed by the detectors being displayed similarly field by field by a display apparatus, at least two fields constituting one frame, and to apparatus suitable for use in such a system.

The invention is particularly though not exclusively relevant to thermal imaging systems where the detectors are infrared sensitive.

One method presently employed for producing a visible image from a line array of detectors sensitive to infrared radiation is to sweep an infrared image of the scene across the array of cells by means of a frame scanning mirror. The output signal from the detectors are then amplified in individual channel amplifiers and the resulting signals time-division multiplexed to produce a video waveform of the line structure of the scene. Thus the detectors are scanned sequentially to derive a waveform that is used to intensity modulate an electron beam in a cathode ray tube and so produce a sequential line scanned visible image of the scene.

With such a system the multiplexing rate is generally high, especially when it is desired to present a flicker-free picture of the scene. Current multiplexing rates are of the order of 1.5 MHz and there is a requirement to increase this rate by an order of magnitude.

With one such system employing a multiplexing rate of 1.5 MHz having 20 frames per second and a picture consisting of $100 \times 250$ picture elements, the sampling period is 660 n sec however due to a signal channel risetime of about 100 n sec when switching between successive signal channels, the useful sampling period is reduced to about 450 n sec. Switching transients also tend to reduce the useful sampling period. It would therefore be advantageous to extend the sampling period so as to reduce the effect of the risetime and the switching transients.

As will be realized from the above, the picture element sampling rate in an imaging system is related to the frame scanning rate. What is required of an imaging system is to present an image to the viewer that is subjectively acceptable. For example, a flicker-free picture with the capability of showing changes in the scene at a rate that can be resolved by the human eye. Thus, if a flicker-free picture were presented to the viewer at a frame rate of 5 frames a second it could convey all of the required information. The picture element sampling rate in such a system would therefore be reduced by a factor of 4, assuming that a 20 frames per second picture was originally acceptable. With such a low frame rate system there may be a distraction due to apparent net motion of the picture replenishment pattern.

It is an object of the present invention to provide an imaging system and apparatus in which a low frame rate may be employed but which is capable of providing a substantially flicker-free picture to a viewer and without apparent net motion of the picture replenishment pattern.

The imaging system according to the invention is characterized in that the directions of scan of successive fields are opposite to each other, the detectors are sampled in a pseudo-random manner, and the number of times that the pseudo-random pattern occurrs during one field period is a non-integer.

By the term "sampled in a pseudo-random manner" we understand that the sampling does not take place in a truly random manner but one in which when the scene is reconstituted on a display arrangement causes the picture replenishment pattern, when visible at a slow scan rate, to appear random to the human eye. Thus a reproduced display of the scene has a dot (picture element) pattern.

The array of detectors may be formed as an in-line array in which case each detector will view a picture element along the line of the array. Such an in-line array of detectors may be at right angles to the motion of the field or may be at an acute angle thereto. Alternatively, the array of detectors may be staggered.

Preferably the number of fields forming a frame is greater than two and preferably a multiple of two. In one preferred form of the invention the number of fields per frame is 10, i.e., five in the forward direction and five in the reverse direction. With such a form each field may be considered to consist of a non integral number of viewed scene areas, an integral number of which are present during each frame. In this way the incomplete area at the end of one field is continued at the beginning of the next field, scanning being in the opposite direction.

With such an arrangement the detectors of the array are each sampled once during their scan over an area, the pseudo-random sampling pattern being the same for each area. By choosing a non-integral number of such areas per field and employing a suitable sampling pattern which is preferably the same for each area, coincidence of sampled picture elements will not occur during a single frame while still ensuring that each picture element is sampled once during the said frame.

When viewing the infrared radiation from a scene, the detector should be sensitive to infrared radiation and may be of the indium antimonide type. If, however, it is desired to view a scene by way of the visible light emitted from it, the detectors may be photo cells or other detectors sensitive to visible light.

The invention also provides apparatus for carrying the system of the invention into effect.

Figure 2:
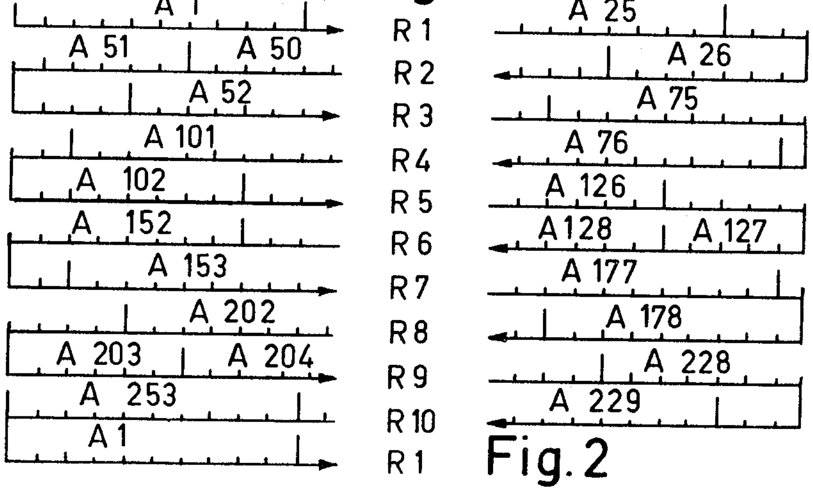
Figure 3:
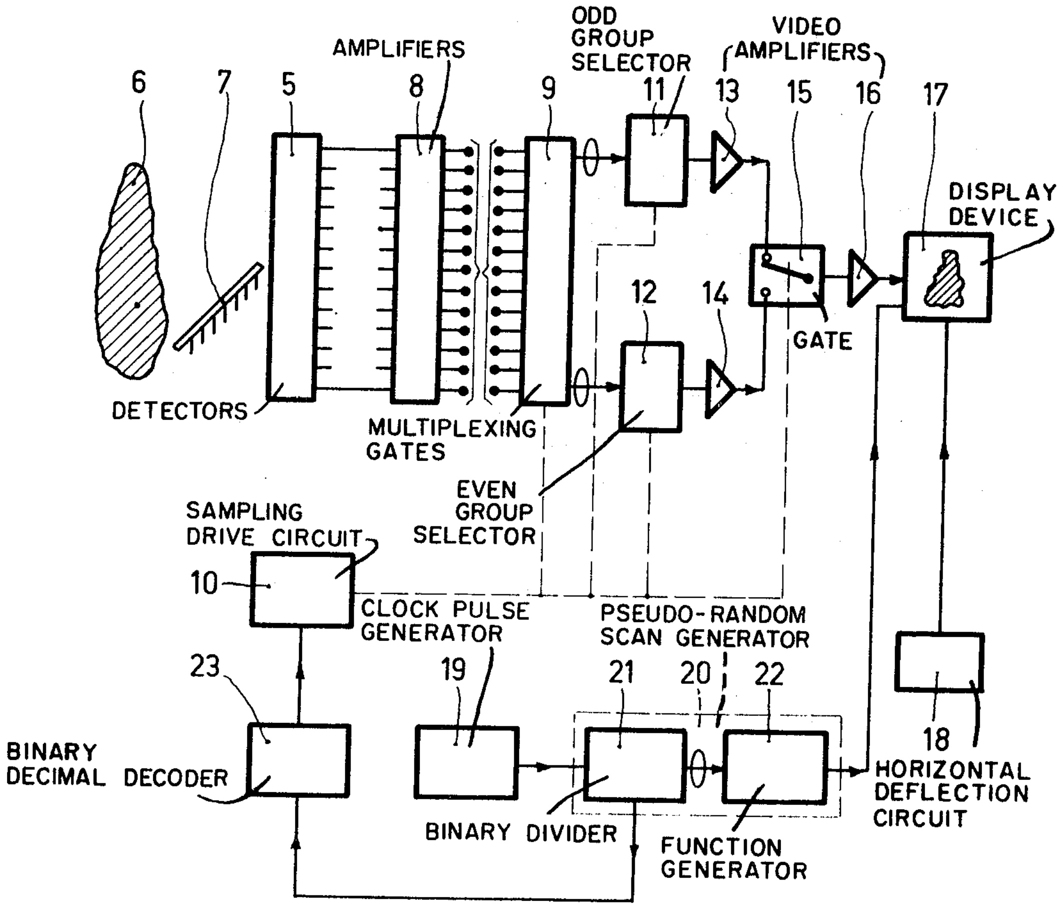
Figure 4:
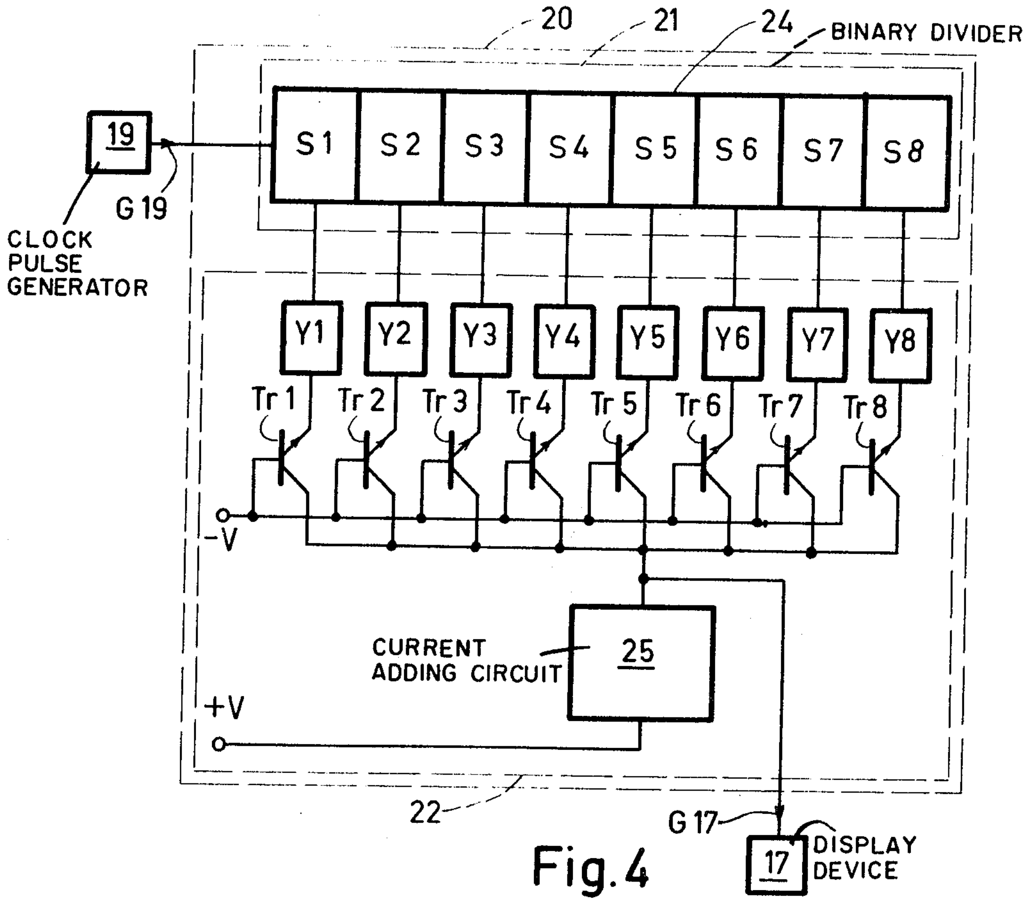
Figure 5:
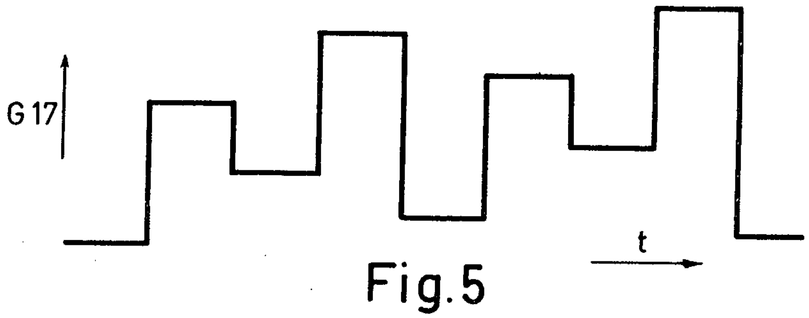

The above and other features of the present invention will be more readily understood by a perusal of the following description having reference to the accompanying drawings in which:

FIGS. 1 and 2 are diagrams to illustrate the system of the present invention, FIG. 3 is a block diagram of apparatus capable of being employed in the system of FIG. 1, FIG. 4 is a block diagram of a part of the apparatus of FIG. 3, and FIG. 5 is a diagram explaining the operation of a part of FIG. 4.

The embodiment of the invention to be described with reference to FIGS. 1 and 2 provides an image having 253 picture elements P in the horizontal direction and 256 picture elements P in the vertical direction and employs a frame rate of 5 frames per second. Each frame is made up of 10 fields R1 – R10. The scanning of consecutive fields is in opposite directions with the direction of field motion being from either left to right or right to left across FIG. 1. A line array of detectors scanning each field R is parallel to the vertical side of FIG. 1, the number of detectors being equal to the number of picture elements P in the vertical direction (i.e. 256). Each field R is considered to be broken up into a nonintegral number of parallel vertical areas A, each area A in the vertical direction being the full 256 picture elements P in height. However, in the horizontal direction, each area A is only 10 picture elements P wide. Thus 25.3 areas A exist in one field R, the portion of an area A (0.7) remaining at the end of a field being provided in the reverse direction of scan in the next field. As the line array of detectors passes over an area A each cell is sampled once and thus only one tenth of the picture information contained within an area A is obtained in each field. The sampling of the detectors takes place in a pseudo random manner, the sampling pattern being the same for each area A when considered in the direction of scan (field motion). Thus with a suitably chosen sampling pattern, coincidence of sampled picture elements does not take place during the fields R of a frame, not even during the fifth and sixth fields R5 and R6 when overlap of the areas A takes place as these fields are being scanned in opposite directions.

After the completion of ten fields R1–R10 (one frame) each picture element P has been sampled once. The scanning process of the areas A is being repeated after the completion of each frame. FIG. 1 shows diagrammatically the position of the areas A during the first field scan of a frame, this first scan taking place in what is considered to be the forward direction, i.e., from left to right across FIG. 1. The pseudo random sampling pattern is shown in the first area A1 by the crosses, P1 and P230 representing the picture element P viewed by the first and two hundred thirtieth detectors, respectively. The same sampling pattern is repeated as scanning takes place over the remaining areas A and is again shown in FIG. 1 in the final complete area 2 of the first field R1, i.e., the twenty-fifth area A25 which ends at the broken line 3. The remaining three horizontal picture elements 3P are used together with the first seven horizontal picture elements P of the second field R2 (which is scanned in the reverse direction, i.e., from right to left of FIG. 1) to form a complete area, i.e., the twenty-sixth area A 26. The same pseudo random sampling pattern is again employed but the positions of the sampled elements in the seven picture element line of the second field R2 are reversed spatially due to the reverse direction of field scan. The position of the sampled elements P at the start of the second field R2 are shown in FIG. 1 by the crosses contained within circles, the boundary of the area A26 completed by the seven picture element lines of the second field R2 being indicated by the chain link line 4. This process of area scanning and partial overlap is continued, as shown diagrammatically in FIG. 2, until the ten field R1–R10 of the frame have been completed after which the process is repeated frame by frame.

The choice of the number of fields per frame as an integral number of two ensures that all picture elements P are scanned only once during one frame period. In case of two fields per frame, half the number of picture elements P is scanned without overlap.

FIG. 3 shows an apparatus suitable for providing and reproducing an image in accordance with the system described above. In FIG. 3 the 256 detectors are formed as an in-line array 5 which is arranged to scan a scene 6 by means of a scanning mirror 7. The detectors of the in-line array 5 are connected to individual channel amplifiers contained within channel amplifiers unit 8. The individual channel amplifiers are interconnected to multiplexing gates 9 in a manner that is determined by the required pseudo random sampling pattern. The read-out from the gates 9 is determined by a pulse train derived from a sampling drive circuit 10 which is driven in a manner as will be hereinafter described. The outputs from the gates 9 are separated and passed to two selector circuits, those from the odd numbered gates are taken to an odd group selector 11 while those from the even numbered gates are taken to an even group selector 12, the gates 9 being numbered sequentially in decimal code. The outputs from the two group selectors 11 and 12 pass through individual video amplifiers 13 and 14 whose outputs are connected to a high speed gate 15. The group selectors 11 and 12 and high speed gate 15 are all driven by the sampling drive circuit 10. The two group selectors 11 and 12 are to simplify the drive circuits, reduce cross coupling between channels and improve the risetime of the signal paths.

The output from the high speed gate 15 is applied to a main video amplifier 16 which modulates the electron beam of a cathode ray tube provided in a display device 17. A horizontal deflection circuit 18 provides the forward and reverse horizontal deflection across the tube of the display device 17 in accordance with the direction of scan of the line array of detectors 5. The vertical deflection however, is not of the normal type because the display has to reproduce the predetermined pseudo-random pattern and this is done in the following manner. A clock pulse generator 19 provides pulses which drive a pseudo random scanning generator 20 which comprises a binary divider 21 and a digital function generator 22. The clock pulses from the generator 19 directly drive the binary divider 21 whose operation will hereinafter be described in more detail with reference to FIG. 4, as will the operation of the function generator 22 which is driven by the binary divider 21. The binary divider 21 provides a further output which is used to drive a binary decimal decoder 23 which in turn drives the sampling drive circuit 10. The output from the pseudo-random scanning generator 20 provides the vertical deflection for the display device 17 in order to illuminate the correct areas of the scene as determined by the pseudo random sampling pattern.

In practice the pseudo random sampling pattern is generated by the generator 20 which causes correct positioning of the picture elements on the display device 17. This pattern determines the required interconnections between the channel amplifiers unit 8 and the multiplexing gates 9 to ensure that a sequential readout from the gates 9 produces the required sampling of the detectors and hence picture elements for correct reproduction at the display device 17.

FIG. 4 shows the pseudo random scanning generator 20 of FIG. 3 above in greater detail. The binary divider 21 comprises a binary divider chain 24 consisting of eight stages S1–S8 and driven by clock pulses G 19 from the clock pulse generator 19. Individual outputs from each binary stage S1–S8 are taken to individual current defining circuits Y1 - Y8 which are in turn connected to the emitter electrodes of individual transistors Tr1 –Tr8. The base electrodes of these transistors are commoned and taken to a source of bias voltage –V while their collector electrodes are commoned and taken through a current adding circuit 25 to the positive terminal of the bias supply +V. The outputs from the binary stages S1 –S8 are in binary combination, the output corresponding to the number of the clock pulse G19 taken from the commencement of sampling. Each output from a binary stage S1–S8 causes its corresponding transistor Tr1–Tr8 to conduct, allowing the current defined by the associated current defining circuit Y1 –Y8 to pass to the current adding circuit 25. The interconnected collectors of the transistors Tr1–Tr8 are connected to the display device 17 to which a deflection current G17 is applied. The outputs from the binary divider stages S1–S8 appear either singly or in combination and when in combination the currents are added together in the current adding circuit 25. The first clock pulse G19 causes an output from binary stage S1 which energizes transistor Tr1. The next clock pulse G19 causes an output from binary stage S2 to energize transistor Tr2 while the third pulse G19 causes an output from both stages S1 and S2 to energize transistors Tr1 and Tr2. This continues in the binary sequence until the binary equivalent 256 is reached and the additive currents used to produce the maximum vertical deflection. The binary count then recommences.

The following table shows the relation of the deflection current G17 to the output of the binary stages S1–S8 and hence the clock pulse sequence for the first eight clock pulses G19.

TABLE

| G19 | S1 Y1 0.5 | S2 Y2 0.25 | S3 Y3 0.125 | S4 Y4 0.0625 | S5 Y5 — | S6 Y6 — | S7 Y7 — | S8 Y8 — | G17 |
|---|---|---|---|---|---|---|---|---|---|
| 0 | 0 | 0 | 0 | 0 | 0 | 0 | 0 | 0 | 0 |
| 1 | 1 | 0 | 0 | 0 | 0 | 0 | 0 | 0 | 0.5 |
| 2 | 0 | 1 | 0 | 0 | 0 | 0 | 0 | 0 | 0.25 |
| 3 | 1 | 1 | 0 | 0 | 0 | 0 | 0 | 0 | 0.75 |
| 4 | 0 | 0 | 1 | 0 | 0 | 0 | 0 | 0 | 0.125 |
| 5 | 1 | 0 | 1 | 0 | 0 | 0 | 0 | 0 | 0.625 |
| 6 | 0 | 1 | 1 | 0 | 0 | 0 | 0 | 0 | 0.375 |
| 7 | 1 | 1 | 1 | 0 | 0 | 0 | 0 | 0 | 0.875 |
| 8 | 0 | 0 | 0 | 1 | 0 | 0 | 0 | 0 | 0.0625 |

FIG. 5 shows the relationship of the picture elements P in the vertical direction and also the deflection current G17 for the first eight clock pulses G19 given in the above table. This Figure also shows the resulting deflection current G17 for these first eight pulses as a function of time *t*.

In an imaging arrangement employing the system and apparatus described above it was found that a substantially flicker-free picture could be obtained with the frame rate of 5 frames per second.

What is claimed is:

1. An imaging system comprising an array of detectors which are sensitive to radiation from a scene to be viewed, means for scanning the scene to project the radiation on said array of detectors field by field, means for sampling the detectors in a pseudo-random pattern so that each detector is sampled once for every picture element it traverses in a frame, a display apparatus, means for displaying the picture elements of the scene viewed by the detectors similarly field by field on said display apparatus, each frame comprising at least two fields scanned successively in opposite directions.

2. An imaging system as claimed in claim 1 wherein each field is divided into a non-integral number of areas while an integral number of said areas make up a frame, the non-integral portion of an area remaining at the end of one field being completed in the following field which is scanned in the opposite direction, each detector of said array being sampled once each time said array scans an area of a field.

3. An imaging system as claimed in claim 2 in which the number of fields forming a frame is an integral multiple of two.

4. An imaging system as claimed in claim 2, characterized in that the array of detectors are sampled in a pseudo-random pattern in their scan over an area, said pattern being identical for each scan over each area.

5. An imaging system as claimed in claim 3 wherein the radiation from the scene is infrared radiation and said array of detectors being infrared sensitive.

6. An imaging system as claimed in claim 3 wherein the radiation from the scene is visible light and said array of detectors is comprised of photocells.

7. An imaging system as claimed in claim 1 wherein said scanning means includes means for sweeping the scene to produce a field motion in a given direction, said system further comprising a pseudo random scan generator for producing a waveform for scanning at right angles to the field motion.

8. An imaging system as claimed in claim 7 wherein said pseudo-random scan generator comprises a binary divider stage driven by a clock pulse generator.

9. An imaging system as claimed in claim 8 wherein said sampling means includes a plurality of gate circuits coupling said detector array to the display apparatus, and means for coupling the output of said binary divider to said gate circuits to control the operation thereof.

10. An imaging system as claimed in claim 7 wherein the pseudo random sampling pattern for said array of detectors is generated by said pseudo-random scan generator, 11. An imaging system as claimed in claim 1 further comprising a cathode ray tube display device for reproducing the viewed scene, and wherein said sampling means comprises a pseudo-random scan generator that produces an output signal for controlling the sampling of the detectors, and means for coupling said scan generator to one set of deflection coils of said cathode ray tube.

12. A display system in which all of the picture elements of a scene to be viewed are reproduced during a frame, each frame comprising at least two fields scanned consecutively in opposite directions, said system comprising, an array of detectors responsive to the radiation from the scene, means for scanning the scene to project the radiation therefrom onto the array of detectors field by field, consecutive fields being scanned in opposite directions, means for sampling the detectors in sequence in a pseudo random pattern relative to the field motion, a display device coupled to the output of said detector array, and means for synchronizing the display device with said sampling means so that the signal information developed by the detector array is similary displayed field by field on the display device.

13. A display system as claimed in claim 12 wherein the detectors are arranged as an in-line array at right angles to the direction of field motion.

14. A display system as claimed in claim 12 wherein the detectors are positioned to form an in-line array arranged at an acute angle to the direction of field motion.

15. A display system as claimed in claim 13 wherein the number of fields forming a frame is greater than two and is an integral multiple of two.

16. A display system as claimed in claim 15 wherein said detectors are mounted in a vertical line and are simultaneously scanned across the scene in a horizontal direction to provide the field motion, said detectors being selectively sampled out of sequence in the vertical direction, and said display device includes a cathode ray tube with horizontal and vertical deflection means, said vertical deflection means being synchronized with the vertical sampling of the detectors.

17. A display system as claimed in claim 16 wherein said sampling means comprises a scan generator that produces a binary weighted output signal that is coupled to the vertical deflection means of said cathode ray tube.

18. A display system as claimed in claim 17 further comprising a multiplexing gate circuit interconnecting the detector array with a beam control electrode of the cathode ray tube, and means further coupling said binary weighted signal to said gate circuit to control the operation thereof in synchronism with the vertical deflection means of the cathode ray tube.

19. A display system as claimed in claim 13 wherein the number of fields forming a frame is an integral multiple of two, each field being divided into a non-integral number of areas to produce a scan overlap between consecutive fields making up a frame.

20. A display system as claimed in claim 13 wherein said scanning means is arranged to effectively scan the array of detectors across the scene so that the scene is divided into a number of lines simultaneously scanned by all of the detectors, said sampling means being arranged to sample the detectors in order in a pseudo-random repetitive pattern such that successive detectors sample different lines of the scene.

21. A display system as claimed in claim 19 wherein said sampling means is arranged so that each detector is sampled once for each of said areas and said pseudo-random pattern is repeated identically for each area scanned.

22. A display system as claimed in claim 13 wherein each field is divided into a non-integral number of vertical areas so that the non-integral portion of an area at the end of a field is scanned in both of said opposite directions, one direction at the end of the field and the opposite direction at the start of the next field, the number of fields forming a frame being an integral multiple of two, and wherein said sampling means samples each detector once as it scans each area and identically repeats the pseudo-random pattern for each area scanned.

* * * * *